United States Patent

Schupfner

[11] Patent Number: 6,112,154
[45] Date of Patent: Aug. 29, 2000

[54] METHOD AND APPARATUS FOR DETERMINING A ROUTE ON A DIGITIZED ROAD NETWORK STORED IN THE MEMORY OF A NAVIGATION SYSTEM

[75] Inventor: Markus Schupfner, Regensburg, Germany

[73] Assignee: Siemens Aktiengesellschaft, Munich, Germany

[21] Appl. No.: 08/861,855

[22] Filed: May 22, 1997

[51] Int. Cl.[7] .................................................. G06F 17/00
[52] U.S. Cl. ........................................ 701/209; 701/201
[58] Field of Search ................................. 701/200, 201, 701/202, 204, 206, 208, 209, 210; 340/990, 995

[56] References Cited

U.S. PATENT DOCUMENTS

| 4,984,168 | 1/1991 | Neukirchner et al. | 701/210 |
| 5,177,685 | 1/1993 | Davis et al. | 701/209 |
| 5,412,573 | 5/1995 | Barnea et al. | 701/211 |
| 5,422,812 | 6/1995 | Knoll et al. | 701/209 |
| 5,657,231 | 8/1997 | Nobe et al. | 701/209 |
| 5,910,177 | 6/1999 | Zuber | 701/202 |
| 5,926,118 | 7/1999 | Hayashida et al. | 340/995 |

FOREIGN PATENT DOCUMENTS

| 0323485B1 | 7/1989 | European Pat. Off. . |
| 0726447A1 | 8/1996 | European Pat. Off. . |

OTHER PUBLICATIONS

Japanese Patent Abstract No. 09014985 (Kenichiro), dated Jan. 17, 1997.

*Primary Examiner*—William A. Cuchlinski, Jr.
*Assistant Examiner*—Edward Pipala
*Attorney, Agent, or Firm*—Herbert L. Lerner; Laurence A. Greenberg; Werner H. Stemer

[57] ABSTRACT

A navigation system utilizes a digitized road network stored in a non-volatile memory and determines therefrom a travel route from a starting point to a destination point. A partial route is calculated from the starting point to an intermediate destination point and maneuvers for this partial route are generated and output to the user in order to guide the user even before the complete route to the destination point has been fully calculated. When a complete route from the starting point to the destination point has been calculated, the calculated complete route is overlapped with the partial route to define an intersection point between the two routes. The proposed maneuvers for that complete route are then output beginning from the intersection point.

10 Claims, 2 Drawing Sheets

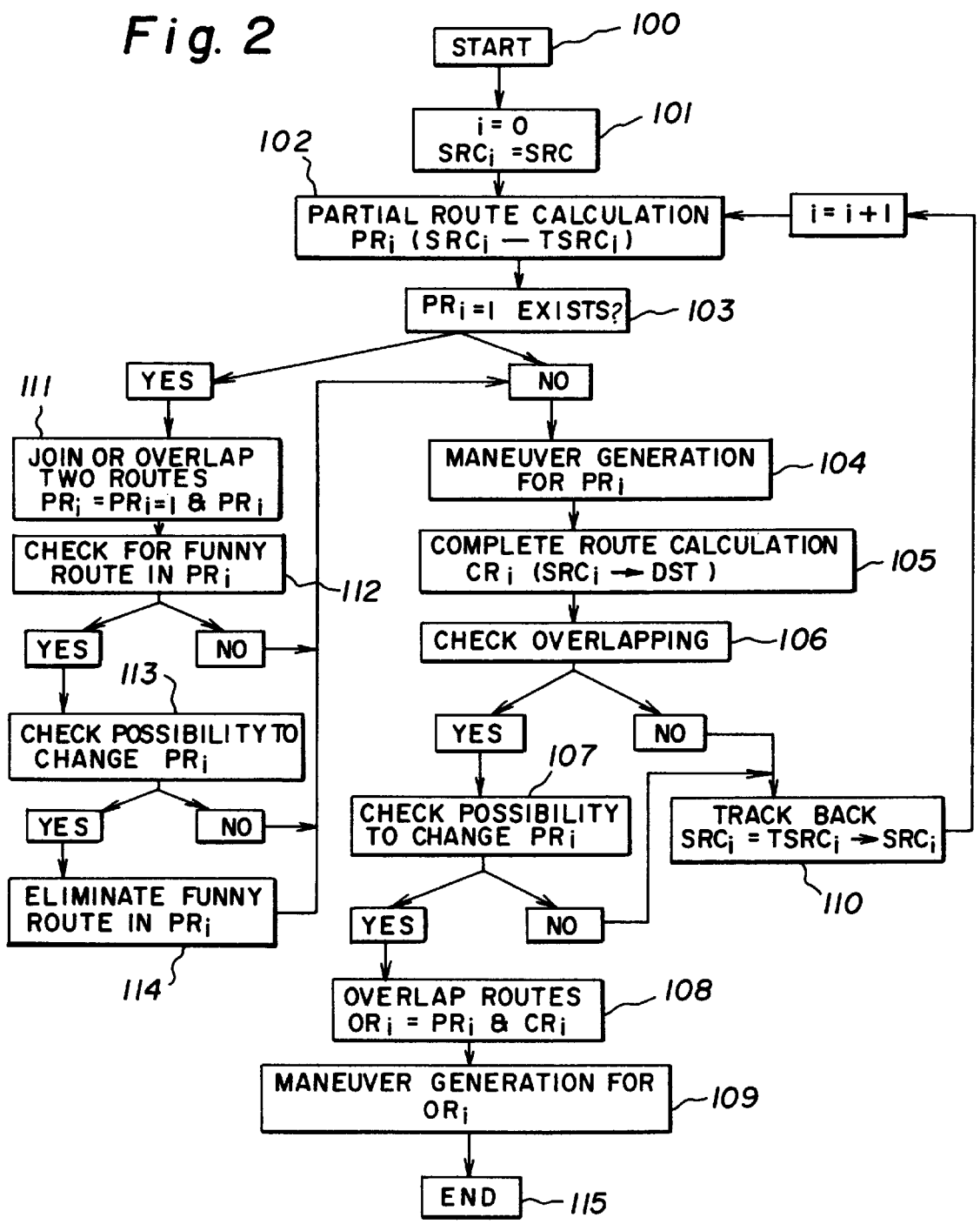

METHOD AND APPARATUS FOR DETERMINING A ROUTE ON A DIGITIZED ROAD NETWORK STORED IN THE MEMORY OF A NAVIGATION SYSTEM

BACKGROUND OF THE INVENTION

Field of the Invention

The invention relates to a method and an apparatus for determining a route from a starting point to a destination point, both points being located on a digitized road network.

U.S. Pat. No. 4,984,168 to Neukirchner et al. discloses a process for quickly and reliably determining a route between a starting point and a destination point in a navigation system. This patent is based on the consideration that in the vicinity of the starting point and destination, traffic is carried over secondary roads, while the longer distances are covered over highways and superhighways. In consequence of merely considering roads carrying long-distance traffic in a very large region, the variety of possible roads is reduced thereby reducing the time required for route computation.

A system has become known from European patent application EP 0 726 447 A1 (corr. U.S. Pat. No. 5,712,788) which explores paths from a starting point to a destination using a technique of selecting an intermediate destination and calculating the costs of each of the alternative routes. The route to the intermediate destination is communicated to the user of the system while a remainder route from the intermediate destination to the final destination is determined. However, this is done before the calculation of the entire route is completed, regardless of whether the route to the intermediate destination is part of the optimum route to the final destination. Adding a route from a disadvantageous intermediate destination to the final destination may lead to substantial and otherwise unnecessary detours.

SUMMARY OF THE INVENTION

It is accordingly an object of the invention to provide a method and an apparatus for determining a travel route, which overcomes the above-mentioned disadvantages of the heretofore-known devices and methods of this general type and which provides for a quick determination of a route between a starting point and a destination point and reliable information guiding a user.

With the foregoing and other objects in view there is provided, in accordance with the invention, a method of determining a travel route from a starting point to a destination point located on a digitized road network stored in a non-volatile memory of a navigation system, the method which comprises:

defining an intermediate destination point between a starting point and a destination point;

calculating an original partial route from the starting point to the intermediate destination point, and outputting partial route information to a user interface;

calculating a complete route from the starting point to the destination point;

overlapping the complete route with the partial route and defining an intersection point between the complete route and the partial route; and outputting complete route information beginning from the intersection point.

According to the invention, a route from a starting point to a destination point, which are located on a digitized road network, are determined by calculating a partial route from the starting point to a temporary destination point and calculating a complete route from the starting point to the destination point. The maneuvers of the partial route can be output to the user while the complete route is being calculated. Thus, a user of the system may begin driving before the entire route to the destination and its maneuvers have been determined. Once the complete route has been calculated, it is overlapped with the partial route to define an intersection point between the complete route and the partial route. The maneuvers of the calculated complete route are then output to the user beginning from an intersection point between the partial route and the complete route.

The present invention is particularly suitable for a navigation system using incremental route calculation as disclosed by European patent application EP 0 726 447 A1.

In accordance with an added feature of the invention, the method further comprises generating maneuvers for the partial route and displaying the partial route maneuvers as the partial route information, and generating maneuvers for the complete route and displaying the complete route maneuvers as the complete route information.

In accordance with another feature of the invention, the complete route maneuvers are output starting from the intersection point, if the partial route and the complete route intersect in a segment of the travel route which has not been passed yet by the user.

The method further comprises, if no intersection point between the partial route and the complete route is found in the overlapping step:

tracking back the temporary destination point towards the starting point, but no farther than to a present position of the user, and determining a new starting point;

subsequently calculating a new partial route beginning from the new starting point to a new temporary destination point and outputting new partial route information to the user;

calculating a new complete route from the new starting point to the destination point and overlapping the new complete route with the new partial route; and if the new partial route and the new complete route have at least one intersection point, outputting new complete route information from the intersection point onward.

In accordance with a further feature of the invention, the new partial route is overlapped with the preceding partial route, and, if the new partial route and the preceding partial route have an intersection point, the new partial route is dismissed and a different new partial route is calculated without such intersection point.

Alternatively, if the new partial route and the preceding partial route have an intersection point, but a different partial route without intersection point cannot be calculated, the method comprises a step of generating and outputting maneuvers for the new partial route.

In accordance with an added feature of the invention, the method also comprises calculating a further partial route beginning from the intermediate destination point to a further destination point, if the calculation of the complete route is not finished before arrival at the intermediate destination point.

In accordance with an additional feature of the invention the method includes determining a distance from the starting point to the intermediate destination point as a function of a statistical speed for route calculation, a route type and a current speed, such that a probable travel time to the intermediate destination is longer than a probable period of time for calculating the complete route.

With the above and other objects in view, there is also provided, in accordance with the invention, a navigation system for determining a travel route from a starting point to a destination point, comprising:

a non-volatile memory storing a digitized road network;

a microprocessor connected to the non-volatile memory, the microprocessor being programmed to determine a route from a starting point to a destination point by:

calculating a partial route from the starting point to an intermediate destination point and calculating a complete route from the starting point to the destination point; and overlapping the partial route from the starting point to the intermediate destination point with the complete route from the starting point to the destination point;

and a user interface for providing a user partial route information until the complete route is calculated and overlapped with the partial route and for providing the user with complete route information connecting from the partial route to the destination point.

Other features which are considered as characteristic for the invention are set forth in the appended claims.

Although the invention is illustrated and described herein as embodied in a method and apparatus for determining a route, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF OHE DRAWING

FIG. 2 is a flow chart describing the operation of a specific embodiment of the invention.

DESCRIPTION OF THE PREFERRED EMBODIMENTS

Figure 1:
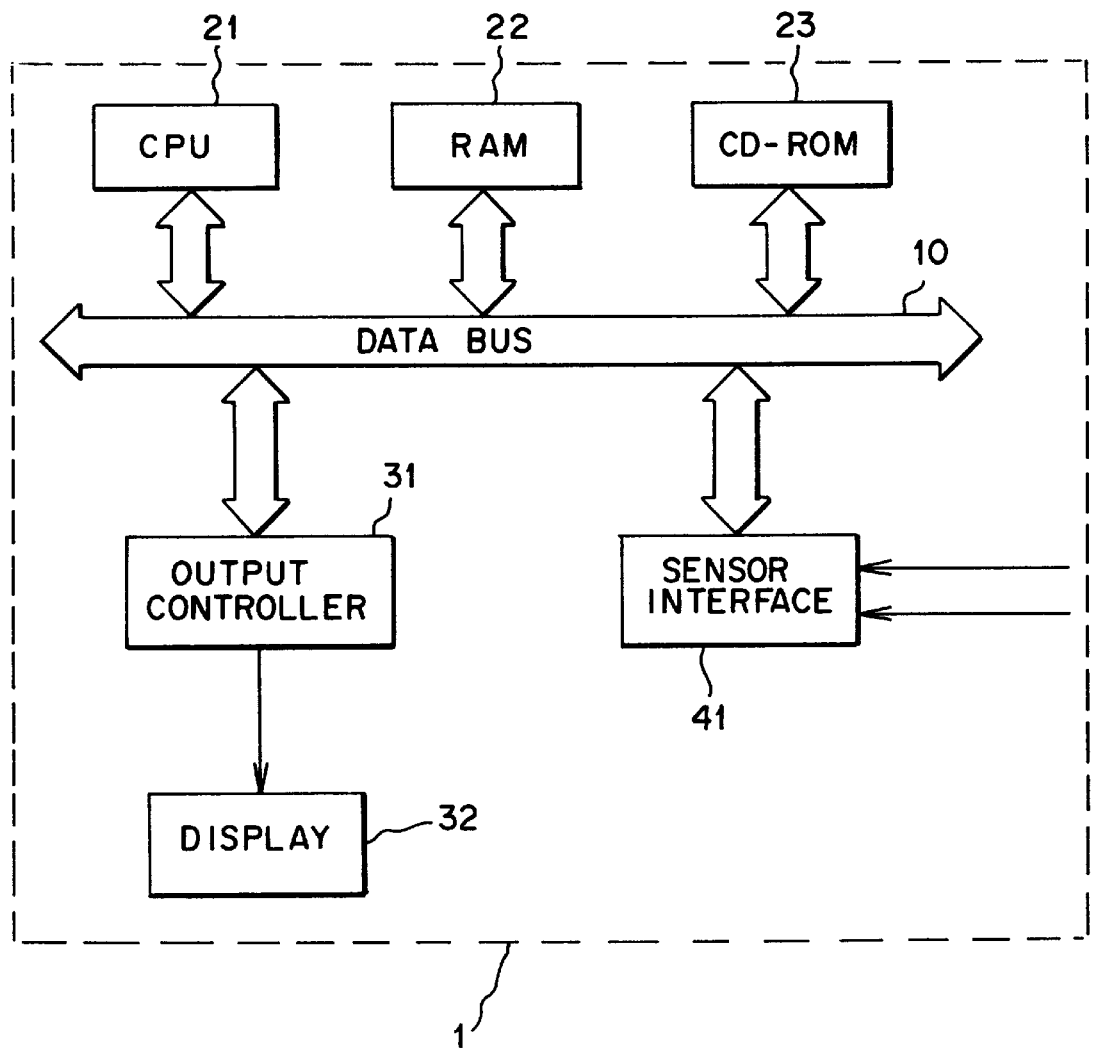
FIG. 1 is a block diagram of a vehicle navigation system for use with the present invention.

Referring now to the figures of the drawing in detail and first, particularly, to FIG. 1 thereof, there is seen a block diagram of a specific embodiment of a vehicle navigation system 1 for use with the present invention. A microprocessor or CPU 21 receives positional information via a data bus 10 and a sensor interface 41. Typically, a mileage sensor, an angular velocity sensor and a GPS sensor are connected to the sensor interface 41. The CPU 21 determines a current position of the vehicle from the sensor signals thus received. Furthermore, the CPU 21 performs signal processing, dead-reckoning and route guidance functions. The software directing the operation of CPU 21 is stored in RAM 22. Additionally a read-only memory (ROM) may be provided comprising a basic operating system of the navigation system.

A CD-ROM 23 supplies digitized road network information which is the basis for determining a route from a starting point to a destination point selected by a user.

The CPU 21 computes guidance information which is communicated via an output controller 31 to a display 32. Instead of an optical output, an acoustic output is equally possible. The display alerts the driver or user to a necessary maneuver in due time before the vehicle reaches the respective location where the maneuver has to take place.

Referring now to FIG. 2, the flow chart illustrated therein describes the operation of a specific embodiment of the navigation system according to the invention. Step 100 designates the start of a partial route calculation. The partial route runs from a starting point selected by the driver (normally, the user need not enter a starting point, because, upon initiating any input at the user interface, the navigation system reads the current GPS input; the user need only input the destination and the system calculates from the known position of the vehicle) to a temporary destination determined by the CPU 21. The index i is set to 0 (step 101) indicating that this is the first attempt to determine a partial route PR.

The partial route $PR_0$, from a starting point or source $SRC_o$, selected by the user, to a temporary destination or temporary source $TSRC_0$ is calculated by the CPU (step 102). In practice, good results can be achieved if the length of the partial route is set to about 10% of the length of the complete route to the final destination. This allows a very quick calculation of the relatively short distance between the source and the temporary destination. Correspondingly, the necessary maneuvers to follow the calculated partial route are generated very soon after the driver or user has selected his destination point. Nevertheless, calculation of the complete route from the starting point $SRC_0$ to the selected destination point usually can be completed before the vehicle arrives at the temporary destination $TSRC_0$. However, it is also possible to determine an optimum length of a partial route by considering the calculation time of the complete route. For the details of a sophisticated calculation of a temporary destination or intermediate destination and a complete route, reference is had to the above-mentioned disclosure EP 0 726 447 A1 corresponding to U.S. Pat. No. 5,712,788, which is herewith incorporated by reference.

If it is found (in the query of step 103) that no partial route has been calculated before, i.e., i-1 is a negative number, namely -1, the maneuvers for the partial route are generated (step 104).

During communicating the respective maneuvers of the partial route to the user, the complete route from the source $SRC_i$ to the destination point is calculated in the background (step 105).

The complete route $CR_i$ thus calculated is then overlapped with the partial route $PR_i$ in order to ascertain intersection points between the complete route $CR_i$ and the partial route $PR_i$ (step 106).

If at least one intersection point exists, it is determined whether it is admissible to change from the partial route to the complete route (step 107). A change is inadmissible if it would contradict the maneuver or command presently being displayed. This assures that any source of confusion to the driver is avoided. Moreover, turning onto a different road might be forbidden or the last suitable intersection point might already have been passed.

If the current position of the vehicle, the current guidance state or term restrictions allow changing over to the complete route, then the partial route $PR_i$ and the complete route $CR_i$ are combined. Accordingly, the partial route runs to the predetermined intersection point between the partial route $PR_i$ and the complete route $CR_i$, which is followed by the complete route from the intersection point to the destination point (step 108).

The maneuvers for the overlapped route are generated from the intersection point to the destination point (step 109), and the route calculation is terminated at step 115.

Due to the fact that in about 50% of the cases the determined partial route does not correspond with the optimum route which would have been found if the complete route had been calculated, overlapping of the partial route and the complete route allows minimizing of deviations from the complete route. As in about 95% of the cases, an admissible change from the partial route to the complete route can be found with the first overlap of a partial route and a complete route, the system will not be kept busy for the entire guidance time. In most cases, only the time for partial and complete route calculation is required.

In case that no intersection point between the partial route and the complete route (step 106) or no admissible change-over from the partial route to the complete route is found (step 107), the partial route is tracked back in the direction to the current position of the vehicle in order to define a new "starting point" or source $SRC_{i+1}$ (step 110 and index increment in loopback to step 102). The distance between the current position of the vehicle and the new source $SRC_{i+1}$ should be great enough to allow completion of the new source calculation of a new partial route $PR_{i+1}$ while the vehicle moves in that direction. This ensures that the driver of the vehicle is permanently provided with non-contradictory maneuvers or instructions.

Starting from the new source $SRC_{i+1}$, a new partial route $PR_{i+1}$ to a new temporary destination point $TSRC_{i+1}$ is calculated (step 102).

In this case the query at step 102 will determine that a previous partial route exists, such as the partial route $Pr_{i=0}$.

Subsequently, the previous partial route $PR_{i-1}$ (e.g. $PR_o$) and the new partial route $PR_i$ (e.g. $PR_1$) are joined (step 111). The new partial route $PR_i$ is different from the previous partial route $PR_{i-1}$ because the starting point is different. The new partial route will not be shorter than the preceding partial route.

The system then checks whether an intersection point or a common route segment of the two joined partial routes exists (step 112). An intersection is also assumed if the two subsequently calculated routes are identical. A "funny route" is a deviation form the optimum route, i.e. a detour. If two subsequently joined partial routes include an intersection point, it is that the two routes are identical (the user is sent back) or they cross one another. In either case the user is not guided along the optimum and shortest route.

If this is not the case, the program loops to step 104, where the maneuvers of this combined partial route are generated and the subsequent steps are performed as described above beginning with step 104.

If an intersection point or a common segment are present on the combined partial route (query at step 112), then the system queries whether it is possible to construct this combined partial route without an intersection (step 113). If a correction is not possible, and if a correction could be made (step 114), the maneuvers for the combined partial route are generated (step 104) and the subsequent steps are performed as described above beginning with step 105.

I claim:

1. A method of determining a travel route from a starting point to a destination point located on a digitized road network stored in a non-volatile memory of a navigation system, the method which comprises:
    defining an intermediate destination point between a starting point and a destination point;
    calculating an original partial route from the starting point to the intermediate destination point, and outputting partial route information to a user interface;
    calculating a complete route from the starting point to the destination point;
    overlapping the complete route with the original partial route and defining an intersection point between the complete route and the original partial route; and
    outputting complete route information beginning from the intersection point.

2. The method according to claim 1, which further comprises generating maneuvers for the original partial route and displaying the original partial route maneuvers as the partial route information, and generating maneuvers for the complete route and displaying the complete route maneuvers as the complete route information.

3. The method according to claim 2, wherein the complete route maneuvers are output starting from the intersection point, if the original partial route and the complete route intersect in a segment of the travel route which has not been passed yet by the user.

4. The method according to claim 1, which further comprises, if no intersection point between the original partial route and the complete route is found in the overlapping step:
    tracking back a temporary destination point towards the starting point, but no farther than to a present position of the user, and determining a new starting point;
    subsequently calculating a new partial route beginning from the new starting point to a new temporary destination point and outputting new partial route information to the user;
    calculating a new complete route from the new starting point to the destination point and overlapping the new complete route with the new partial route; and
    if the new partial route and the new complete route have at least one intersection point, outputting new complete route information from the intersection point onward.

5. The method according to claim 4, which further comprises overlapping the new partial route with the original partial route, and, if the new partial route and the original partial route have an intersection point, dismissing the new partial route and calculating a different new partial route without such intersection point.

6. The method according to claim 4, which comprises: if the new partial route and the original partial route have an intersection point, but a different partial route without intersection point cannot be calculated, generating and outputting maneuvers for the new partial route.

7. The method according to claim 1, which further comprises calculating a further partial route beginning from the intermediate destination point to a further destination point, if the calculation of the complete route is not finished before arrival at the intermediate destination point.

8. The method according to claim 1, which comprises determining a distance from the starting point to the intermediate destination point as a function of a statistical speed for route calculation, a route type and a current speed, such that a probable travel time to the intermediate destination is longer than a probable period of time for calculating the complete route.

9. The method according to claim 1, which further comprises outputting the original partial route information to a user interface before a complete route from the starting point to the destination point is available.

10. A navigation system for determining a travel route from a starting point to a destination point, comprising:
    a non-volatile memory storing a digitized road network;
    a microprocessor connected to said non-volatile memory, said microprocessor being programmed to determine a route from a starting point to a destination point by:

calculating a partial route from the starting point to an intermediate destination point and calculating a complete route from the starting point to the destination point; and overlapping the partial route from the starting point to the intermediate destination point with the complete route from the starting point to the destination point; and a user interface for providing a user partial route information until the complete route is calculated and overlapped with the partial route and for providing the user with complete route information connecting from the partial route to the destination point.

* * * * *